June 20, 1939.     F. H. DALRYMPLE     2,163,315
SHAFT COLLAR
Filed Nov. 2, 1937     2 Sheets-Sheet 1
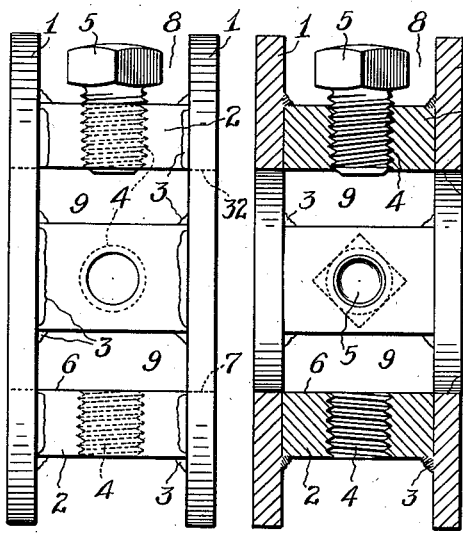
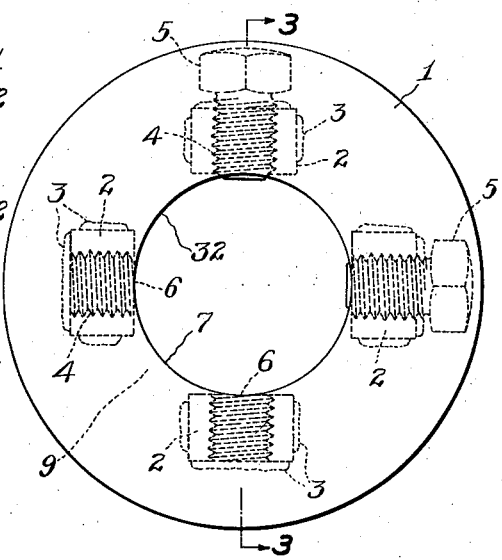
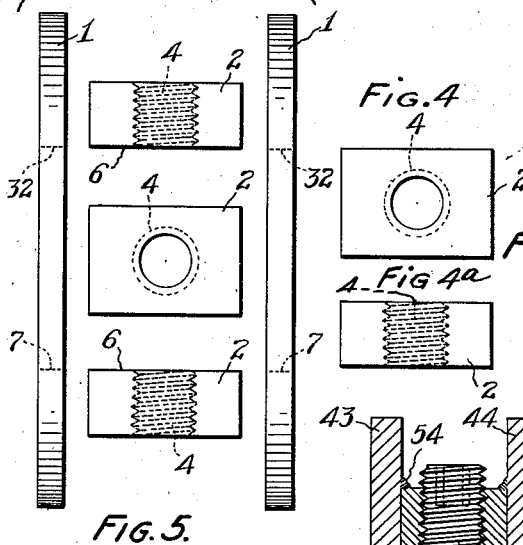
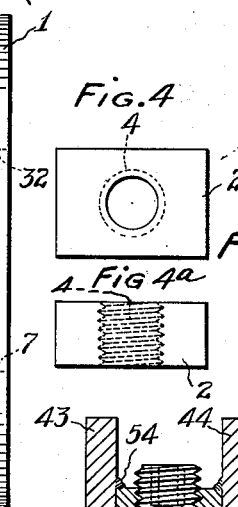
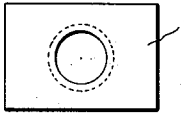
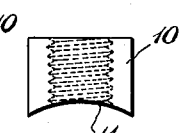
INVENTOR.
FERDINAND H. DALRYMPLE
BY Saywell and Wesseler
ATTORNEYS

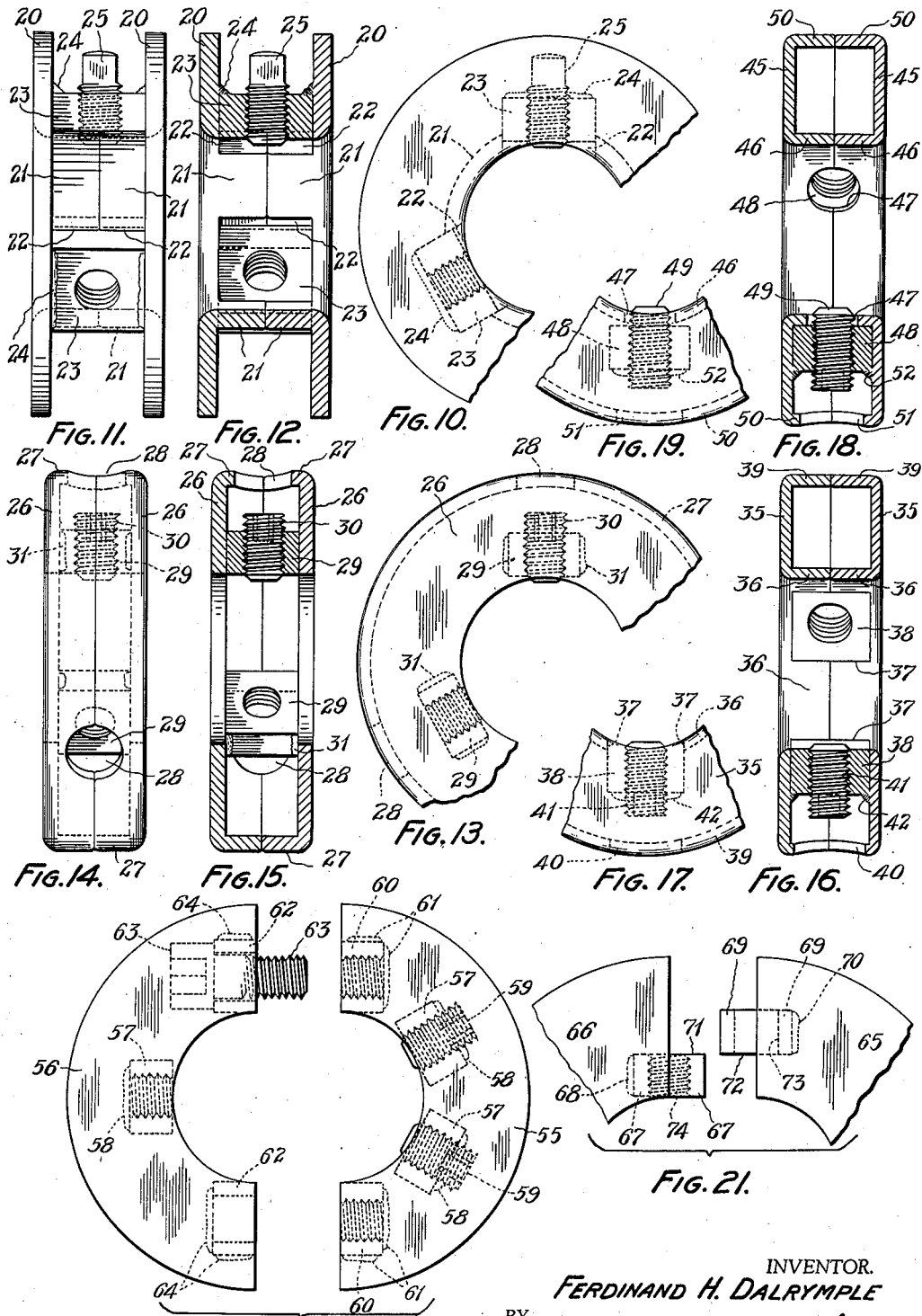

Patented June 20, 1939

2,163,315

UNITED STATES PATENT OFFICE 2,163,315

SHAFT COLLAR

Ferdinand H. Dalrymple, Bedford, Ohio

Application November 2, 1937, Serial No. 172,356

8 Claims. (Cl. 287—52.03)

My invention relates to shaft collars, and particularly to a built-up article of this character comprised of few parts which are readily obtainable as standard market articles or are readily made for the instant purpose from inexpensive material and by a few simple operations. Economy, simplicity and durability are marked characteristics of my invention. The several parts of my improved built-up shaft collar are rigidly secured together to form in effect an integral product and do not depend for their relative rigidity upon detachable interlocking or other connecting means which might in use become loosened and permit relative movement of the several parts.

Preferably, my improved built-up shaft collar is made of drawn and rolled steel, and the objects of the invention are to make the collar without the necessity of machine work, and a collar which shall be stronger, lighter in weight, and cheaper than cast or usual pressed steel collars, which shall be adaptable to a plating or building up of the wearing surface without machining, or adaptable to the use of long-wearing or heat-resisting materials, a collar which will require less space on the shaft, and which shall have only substantially line contacts with the shaft, thus obviating much of the tendency to free or rust to the shaft, and a collar which will not break as readily as cast collars under hammering, chiselling, or other abuse. In the event that there is some freezing of my improved collar to the shaft, the construction of the collar is such that a liberal number of accessible places are afforded through which to insert a penetrating oil or other ameliorants.

The annexed drawings and the following description set forth in detail certain means illustrating my improvements, such means constituting however, only a few of the forms in which the principle of my invention may be embodied.

In said annexed drawings:

Figure 1 is a side elevation of one form of my improved shaft collar, Figure 2 is an end elevation, and Figure 3 is an axial section, taken in the plane indicated by the line 3—3, Figure 1;

Figures 4, 4a and 4b, respectively are plan, side, and end views of a threaded block forming one of the elements shown in Figure 1;

Figure 5 shows the several elements of the collar shown in Figure 1, in separated relation prior to the assembling thereof and the welding of the same into an integral structure;

Figures 6, 6a and 6b, respectively, are plan, side, and end views of a modified form of threaded block;

Figure 7 is a fragmentary view, similar to the side elevational view of Figure 1, showing a collar in which the threaded block shown in Figure 6 has been incorporated;

Figure 7a is a fragmentary vertical axial section of another form of my improved shaft collar, the figure showing in dot and dash lines a cover member providing a safety feature;

Figure 7b is a fragmentary vertical axial section of still another form of my improved shaft collar, in which an intermediate or spacing plate is interposed between and spaced from two side plates to each of which it is securely connected by intermediate internally-threaded blocks;

Figures 8, 8a and 8b, respectively, are plan, side, and end views of a standard square nut, ⅜ inch size, utilized as the block in a form of my improved shaft collar, of which a fragmentary vertical axial section, similar to the section of the form shown in Figure 3, is shown in Figure 9.

Figure 10 is a fragmentary side elevation, similar to Figure 1, showing a modified form of collar containing three spaced nuts, as blocks, which are seated in spaced slots formed in opposed edge-flush inner flanges of opposed annular plate members, and of which form Figure 11 is an end elevation, and Figure 12 is a vertical axial section;

Figure 13 is a fragmentary side elevation, similar to Figure 10, of a modified form of collar whose spaced plate faces have edge-flush opposed outer flanges, of which form Figure 14 is a side elevation, and Figure 15 is a vertical axial section;

Figure 16 is a vertical axial section, similar to Figure 15, of a further modified form of collar, in which the spaced opposed face members are provided with opposed edge-flush outer flanges and in which the threaded blocks are seated in slots formed in opposed edge-flush inner flanges of the face members, and Figure 17 is a fragmentary side elevation of this form of collar;

Figure 18 is a vertical axial section of a modified form of collar whose plate members have opposed edge-flush inner and outer flanges and in which the blocks or nuts are entirely enclosed, Figure 19 being a fragmentary side elevation of this form of collar;

Figure 20 is a side elevation showing two parts of a split collar, in separated condition, embodying certain features of the instant invention; and Figure 21 is a fragmentary side elevation, similar to Figure 20, showing a second form of split collar.

Referring to the accompanying drawings in which the same elements are designated by the same respective numbers in the several views, there is shown in Figures 1–5 a form of my improved shaft collar which comprises two plane side plates 1, Figure 5, which are identical and formed with coaxial bores 32 of substantially the diameter of the shaft for which the collar is designed. These plates 1 are disposed in opposed and spaced relation and rigidly secured together by transversely spaced blocks 2, Figure 4, whose sides are secured to the inner opposed faces of the plates 1 by welds 3. The aforedescribed integral structure consisting of the spaced side plates 1 and the spaced blocks 2 constitutes the entire shaft collar and is fastened to the shaft by any suitable means such as the set screws 5 which engage internal threads 4 formed in one or more of the blocks 2. Preferably, I use as plates 1 standard washers of suitable dimension, and I use as blocks 2 standard nuts. Although all of the blocks 2 shown in Figures 1–5 are internally threaded, it is not necessary so to provide the blocks, if perchance nuts are not used therefor, since only one or a few of the blocks 2 would need to accommodate set screws 5. Only one, or a few of the set screws 5, are needed adequately to secure the collar to the shaft.

In the form of structure shown in Figures 1–5, the contact of the collar with the shaft is substantially only a line contact across the inner surface 6 of the blocks 2, and the contacts 7 on the walls of the bores in the plates 1. Such line contact of the shaft with the collar tends greatly to obviate the freezing or rusting of the collar to the shaft; and, furthermore, in the event some such freezing or rusting does occur, the openings 9 between adjacent blocks 2 afford opportunity for applying penetrating oil or other ameliorants.

When utilizing a set screw 5, of the headed formation shown in Figures 1, 2, and 3, probably standard size nuts would not be serviceable because of the difficulty of tightening and releasing the set screw 5, inasmuch as the nuts would be too small sufficiently to space apart the plates 1. Therefore, I preferably utilize special plane blocks 2, some or all of which are drilled and tapped to engage with the set screw 5, of a length sufficient to so space the opposed plates 1 as to afford a space 8 large enough to permit use of a wrench or other suitable tool upon the head of the set screw 5.

Referring particularly to Figures 6 and 7, I therein show a form of block 10 which has an inner curved wearing surface 11 adapted to conform to the curvature of the shaft with which the collar is designed to be used. I illustrate the securing together of the different elements to form that type of collar by means of fillet welds 12 provided at two sides only of the blocks 10. Of course, in this type of collar there would be a full surface contact between the blocks 2 and the shaft upon which the collar is mounted.

In Figure 7a, I disclose a single side plate 18 to one side of which are secured by welds 33 a plurality of transversely spaced blocks 19, one or more of which is internally-threaded for engagement with screws 34 for securing the collar to a shaft. For purposes of safety, when using this form of collar, a cover 76 is provided, or use made of some standard equipment otherwise associated with the shaft which will provide such a covering safety feature.

In Figure 7b, I disclose a form of improved shaft collar which includes more than two plates. For illustration, I disclose three plates 43—44, each adjacent two of which are longitudinally or axially spaced, the intermediate plate 44 forming a spacing plate and being secured at both its sides to transversely spaced blocks 53, the latter also being secured to the inner sides of the side plates 43, by welds 54, one or more of the blocks 53 being internally-threaded for engagement with screws 75 for securing the collar to a shaft.

In Figures 8 and 9, I disclose a pair of plates 13 held in relatively fixed spaced relation by means of a plurality of interposed transversely spaced standard ⅜-inch square nuts 14 which are rigidly secured to the opposed faces of the plates 13 by welds 15 formed upon the two ends of the nuts 14. Inasmuch as the space 17 between the plates 13 is not sufficient for the convenient manipulation of an ordinary wrench, I use socketed set screws 16 for securing the collar to the shaft.

Referring particularly to Figures 10, 11, and 12, I disclose a pair of spaced opposed plates 20 having inner flanged portions 21 extended toward each other and, preferably, meeting and registering at their opposed inner edges so as to completely inclose the space forming the bore of the collar, with the exception of spaced slots 22 formed in the flanges 21, one slot for each of the spaced blocks 23 which it is designed to use, these blocks 23 being seated in the slots 22. Some or all of the blocks 23 are internally threaded to accommodate square-headed screws 25 for securing the collar to the shaft. The blocks 23 are rigidly secured to the opposed plates 20 by welds 24 formed upon the outer ends of the blocks 23.

Referring particularly to Figures 13, 14, and 15, I disclose a pair of opposed plates 26 formed with outer flanges 27 which are extended toward each other and, preferably, have registering edge portions so as completely to inclose the space within the collar with the exception of spaced slots 28 through which a socketed wrench may be manipulated for operating the socketed set screws 30 which engage blocks 29 rigidly secured to the opposed plates 26 by welds 31 formed upon the sides of the blocks 29.

Referring particularly to Figures 16 and 17, I disclose a combination of the features shown in Figures 10, 11, and 12, and Figures 13, 14, and 15, in that a pair of opposed plates 35 is formed both with inner flanges 36 and outer flanges 39. The flanges 36 are formed with spaced slots 37 within which are seated spaced nuts 38, and flanges 39 are formed with spaced slots 40 through which a socket wrench may be manipulated to operate the socketed set screws 41. The plates 35 are rigidly secured together and to the blocks 38 by welds 42 formed upon the outer ends of the blocks 38.

Referring particularly to Figures 18 and 19, the blocks 48 between the pair of opposed plates 45 are entirely inclosed in that the plates 45 are formed with inner flanges 46 which are continuous except for spaced slots 47 through which the inner ends of the holding socketed set screws 49 pass, and in that the outer flanges 50 are continuous except for spaced slots 51 through which the socket wrench for manipulating the screws 49 can be passed. The plates 45 and the blocks 48 are rigidly secured in relatively fixed positions by means of welds 52 formed upon the outer ends of the blocks 48.

Referring particularly to Figure 20, I therein disclose a form of split shaft collar consisting of two separable portions 55 and 56 which are comprised each of two spaced plates rigidly secured together by means of welds 59 formed about the joint between the opposed faces of the plates 55 and 56 and the outer faces of the internally-threaded blocks 57 adapted to accommodate the set screws 59. Between the opposed faces of the plates forming the collar portion 55 I place internally threaded blocks 60 secured to the plates by welds 61, and between the opposed faces of the plates forming the part 56 I provide rings 62 secured by the welds 64, the hole of the ring 62 being coaxial with the internal threaded portion of the block 60, and of suitable diameter to accommodate the shank of the cap screw 63 whereby the two parts 55 and 56 can be drawn together and relatively rigidly secured.

In Figure 21, I disclose a modified means for securing together the two parts 65 and 66 of a split collar. These means comprise a ring 69 secured between the two plates of the part 65 by welds 70 and laterally inwardly extended from the space between the said two plates; also, a positioning of some of the threaded blocks 67 interposed between the plates of the parts 66 and rigidly secured thereto by the welds 68, so as to cause said blocks 67 to extend laterally inwardly from the part 66. The ring 69 and the block 67 are so relatively positioned that, when the parts 65 and 66 of the split collar are moved toward each other, the surface 72 of the ring 69 slides over the surface 71 of the nut 67 and the hole 73 of the ring 69 registers with the aperture 74 in the threaded block 67. Thus, a set screw can be passed through the hole 73 and engaged with the thread of the aperture 74 for drawing together and relatively rigidly securing the two collar parts 65 and 66 and for securing the collar to the shaft.

In the various forms of my improved shaft collar the opposed spaced annular plates are entirely separate except as they are secured together by the intermediate blocks or nuts. In other words, the blocks or nuts are integral parts of the collar proper and do not serve merely as means in which to mount and operate the securing screws. Even in the forms of box collars shown in Figures 10–19, the spaced plates are not connected together other than by the integrally joined interpositioned blocks or nuts. Although the box collars shown in Figures 10 to 19 have opposed flush flange edges, the respective pairs of plates 20, 26, 35, and 45 are entirely separate except as they are secured together by the interpositioned blocks 23, 29, 38, and 48. These blocks 23, 29, 38, and 48 are integral parts of the collar proper and not means merely for mounting and actuating the set screws 25, 30, 41, and 49.

What I claim is:

1. A shaft collar comprising opposed spaced plane plates formed with coaxial bores for the reception of a shaft, transversely spaced internally-threaded blocks welded to the opposed faces of the plates and serving as the sole means for holding the plates in relatively fixed positions, and set screws engaging the blocks.

2. A shaft collar comprising opposed spaced plates formed with coaxial bores for the reception of a shaft, transversely spaced blocks welded to the opposed faces of the plates and serving as the sole means for holding the plates in relatively fixed positions, the inner ends of the blocks having a line contact with a prolongation of the peripheries of the plate bores, and means for securing the collar to the shaft.

3. A shaft collar comprising opposed spaced annular plates having respective flanges extended toward each other, said flanges being formed with transversely spaced slots, transversely spaced blocks seated in the slots and rigidly secured to the opposed faces of the plates and serving to hold the plates in relatively fixed positions, and means for securing the collar to a shaft.

4. A shaft collar comprising opposed spaced annular plates having respective inner flanges extended toward each other, said flanges being formed with transversely spaced slots, said plates having also peripheral flanges extended toward each other and contacting with flush inner edges, said peripheral flanges being formed with respective registering slot portions to form transversely spaced slots, and transversely spaced blocks disposed intermediate the inner and peripheral flanges and secured to the opposed faces of the plates and serving to hold the plates in relatively fixed positions, said blocks having internal threads therethrough whose axes intersect the respective slots of the inner and peripheral flanges.

5. A split shaft collar comprising complementary parts each including opposed spaced plates having apertures which form coaxial bores for the reception of a shaft when the parts are assembled together, transversely spaced blocks welded to the opposed faces of the plates and serving as means for holding the plates in relatively fixed positions, other blocks secured to and intermediate the opposed faces of the plates of a collar part, and means cooperating with the blocks for drawing together and securing the collar parts and for securing the collar to the shaft.

6. A shaft collar comprising spaced plates formed with coaxial bores for the reception of a shaft, and transversely spaced nuts rigidly secured to the opposed faces of adjacent plates and serving as the sole means for holding the plates in relatively fixed positions, at least one of said nuts being disposed so that the axis of its threaded portion substantially intersects the axis of said bores.

7. A shaft collar comprising a plate having a perforation for the reception of a shaft, two or more nuts rigidly secured to the plate about the perforation and disposed in substantially confronting relation across the perforation with the axes of the threaded portions of the nuts intersecting the prolongation of the periphery of the perforation, and set screws carried by the threaded portions of said nuts for securing the collar to a shaft extending through the perforation.

8. A shaft collar comprising spaced plates formed with coaxial bores for the reception of a shaft, and transversely spaced blocks rigidly secured to the opposed faces of adjacent plates and serving as the sole means for holding the plates in relatively fixed positions, at least one of said blocks having means for securing the collar to the shaft.

FERDINAND H. DALRYMPLE.